(12) United States Patent
Horn

(10) Patent No.: US 7,472,663 B1
(45) Date of Patent: Jan. 6, 2009

(54) PLANTER SEED TANK ACCESS WALKWAY

(75) Inventor: Rodney Samuel Horn, Woodridge, IL (US)

(73) Assignee: CNH America, LLC, Racine, WI (US)

( * ) Notice: Subject to any disclaimer, the term of this patent is extended or adjusted under 35 U.S.C. 154(b) by 0 days.

(21) Appl. No.: 11/846,668

(22) Filed: Aug. 29, 2007

(51) Int. Cl.
*A01B 15/14* (2006.01)
*A01B 23/04* (2006.01)
*A01B 35/20* (2006.01)
*A01B 39/24* (2006.01)
*A01C 15/00* (2006.01)

(52) U.S. Cl. .................................... 111/200; 172/776
(58) Field of Classification Search ................ 172/776; 111/200
See application file for complete search history.

(56) References Cited

U.S. PATENT DOCUMENTS

| | | |
|---|---|---|
| 2,018,325 A | 10/1935 | Schnell |
| 3,254,919 A | 6/1966 | Birchmeier |
| 3,662,653 A | 5/1972 | Carlson et al. |
| 4,073,345 A | 2/1978 | Miller |
| 4,373,851 A | 2/1983 | Confoey |
| 4,529,215 A | 7/1985 | Strand |
| 4,634,170 A | 1/1987 | Lach |
| 4,744,548 A | 5/1988 | Hathaway |
| 5,094,583 A | 3/1992 | Bills, Jr. et al. |
| 5,358,225 A | 10/1994 | Volpel et al. |
| 5,826,523 A | 10/1998 | Gregor |
| 5,878,679 A | 3/1999 | Gregor et al. |
| 5,947,040 A | 9/1999 | Gregor |
| 5,996,515 A | 12/1999 | Gregor et al. |
| 6,148,748 A | 11/2000 | Bardi et al. |
| 6,149,374 A | 11/2000 | Dershem et al. |
| 6,581,530 B1 | 6/2003 | Hall et al. |
| 6,588,351 B1 | 7/2003 | Hall et al. |
| 6,591,766 B2 | 7/2003 | Williames |
| 6,595,148 B2 | 7/2003 | Meyer et al. |
| 6,688,242 B2 | 2/2004 | Meyer et al. |
| 6,935,254 B2 | 8/2005 | Ostrander et al. |

(Continued)

FOREIGN PATENT DOCUMENTS

JP    05306099 A    11/1993

(Continued)

OTHER PUBLICATIONS

U.S. Appl. No. 11/846,852, Rodney Samuel Horn.

(Continued)

*Primary Examiner*—Christopher J. Novosad
(74) *Attorney, Agent, or Firm*—Rebecca Henkel

(57) ABSTRACT

A towed implement, such as a planter, is provided with an operator platform and ladder for mounting the platform. The platform may be supported on the implement frame, and extends from a position rear of the ground-engaging row units to a position immediately adjacent to seed tanks. The platform may extend between the seed tanks to allow for loading of seeds, inspection of the tanks, removal of debris, and so forth. The ladder for accessing the platform may be fixed or stowable in a raised position. Handrails may be provided on either side of the platform, forward of the platform, and adjacent the ladder for stabilizing the operator during servicing of the implement.

20 Claims, 2 Drawing Sheets

U.S. PATENT DOCUMENTS

Figure 1:
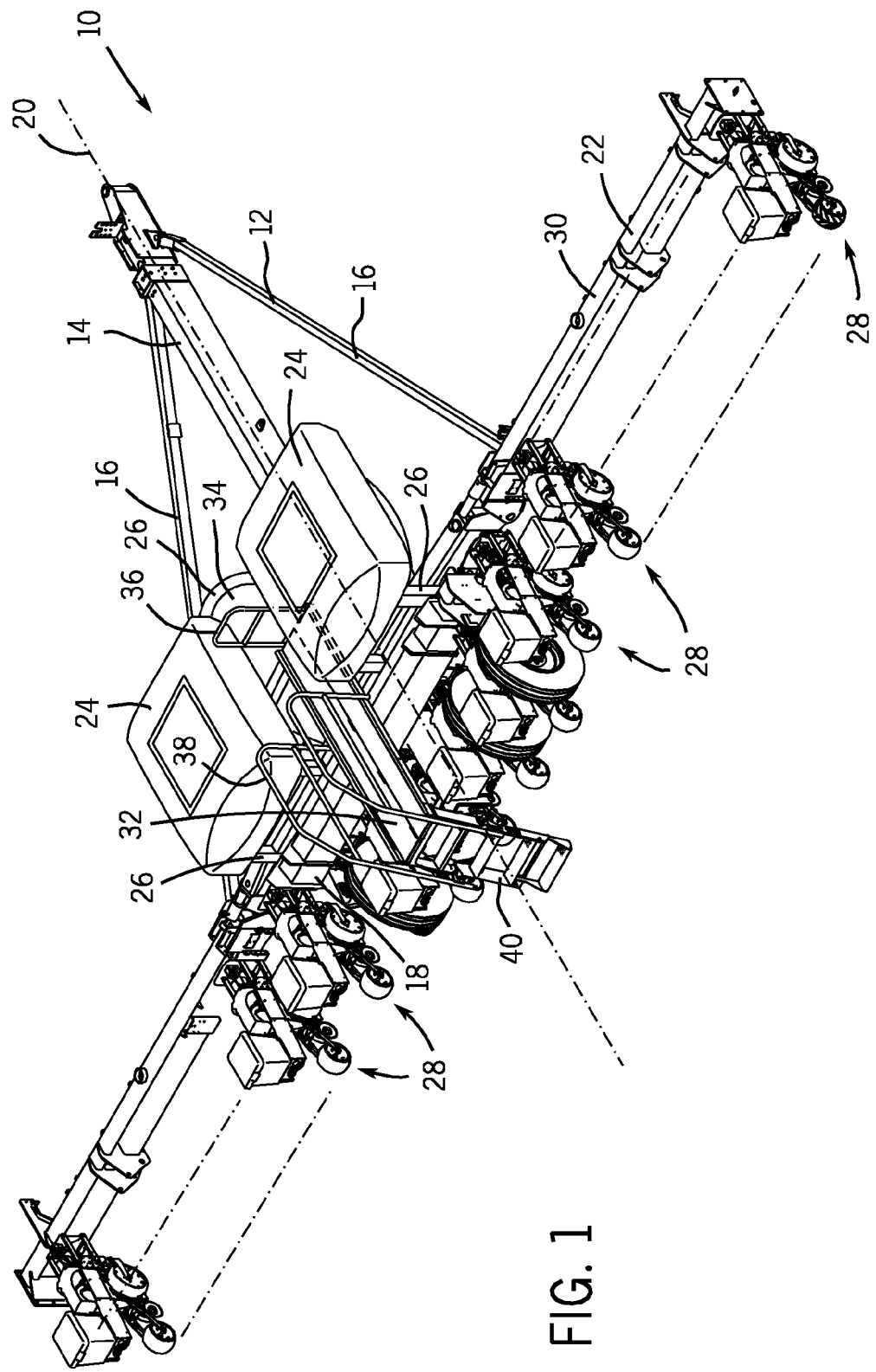

| | | |
|---|---|---|
| 7,051,663 B2 | 5/2006 | Meyer et al. |
| 2003/0084829 A1 | 5/2003 | Lempriere |
| 2004/0187755 A1 | 9/2004 | Memory |
| 2004/0255774 A1 | 12/2004 | Hill |
| 2006/0243179 A1 | 11/2006 | Landphair et al. |

FOREIGN PATENT DOCUMENTS

| | | |
|---|---|---|
| JP | 2004125160 A | 4/2004 |

OTHER PUBLICATIONS

U.S. Appl. No. 11/846,615, Rodney Samuel Horn.
U.S. Appl. No. 11/955,894, Rodney Samuel Horn.

PLANTER SEED TANK ACCESS WALKWAY

BACKGROUND

The present invention relates generally to agricultural implements, and more particularly to a planter or similar implement designed to be towed behind a work vehicle, and that is equipped with a ladder or stairway and a platform permitting a worker to service the implement.

A wide range of agricultural implements are know and are presently in use, particularly designed for towing behind a work vehicle, such as a tractor. In one family of such implements, including tillers, planters, and so forth, a wide swath of ground can be tilled, planted, otherwise worked in each pass of the implement in a tilled or untilled field. Planters, for example, often include frames supported by series of wheels and a tool bar extending transversely with respect to a line of movement of the implement across the field. Attached to the tool bar are a series of row units are disposed for dispensing seeds in parallel rows either in tilled or untilled soil. Seed tanks are typically supported on the implement support structure, such as just forward or over the tool bar. Large amounts of seed may be poured into these tanks and, as the implement is advanced across the field, seeds are transferred from the tanks by a distribution system connected to the row units.

Difficulties may arise in servicing such implements owing to the need to access the upper portions of the equipment, such as the seed tanks in planters. The seed tanks may, for example, have fill openings or lids that can be removed to pour the desired seeds into the tanks prior to moving the implement to a field. Such seeds may be inserted automatically, semi-automatically or manually into the tank. Both before and after hauling the implement to and from the field, and while the implement is in a field, operator access to the seed tanks may be needed, such as for filling, inspection, removal of debris, and so forth. In traditional planter designs, however, the operator may be obliged to climb on the tool bar or implement support structure to access the seed tanks and any other upper-level elements of the implement. While this, in certain situations, may not pose particular problems, it is inconvenient and renders many operations difficult, such as for loading heavy sacks of seed into the tanks.

There is a need, therefore, for improved arrangements in towed implements that permit operators to more easily access upper levels of the implements, such as seed tanks in planters. There is a particular need for arrangements that permit an operator to climb on, stand on, and remain on such upper levels for extended periods, and to move securely on such levels while manipulating heavy articles, such as bags of seed.

BRIEF DESCRIPTION

The present invention provides a novel arrangement for accessing and servicing planters and similar towed implements designed to respond to such needs. In an exemplary embodiment, for example, the implement has a platform mounted on and carried by the implement support structure, such as in a central towed section of the implement. The platform may extend generally horizontally or may be slightly inclined fore and aft, and may be centrally located along a longitudinal access of the implement. The height of the platform is such as to permit an operator to stand on and easily access upper components of the implement. A ladder or stairway, including handrails may extend rearwardly from the platform, or in another direction that will not preclude normal operation of the implement in use. The ladder allows the operator to easily mount the platform for servicing.

In a particular embodiment, the implement may be a planter, and may include a pair of seed tanks on either side of a longitudinal center line of the implement. The platform in this case may extend at least partially between the seed tanks and rearwardly over a level at which the row units are disposed. The platform and ladder are higher than the row units and the base of the ladder is efficiently high to preclude interference with the ground when the implement is towed in a field. At least the ladder may be pivotable or otherwise displaceable or removable to further avoid interference with normal operation of the planter. With such elements in such stowed positions, they avoid any interference with the centermost row units, and permit the implement to tow other implements, where desired.

DRAWINGS

Figure 2:
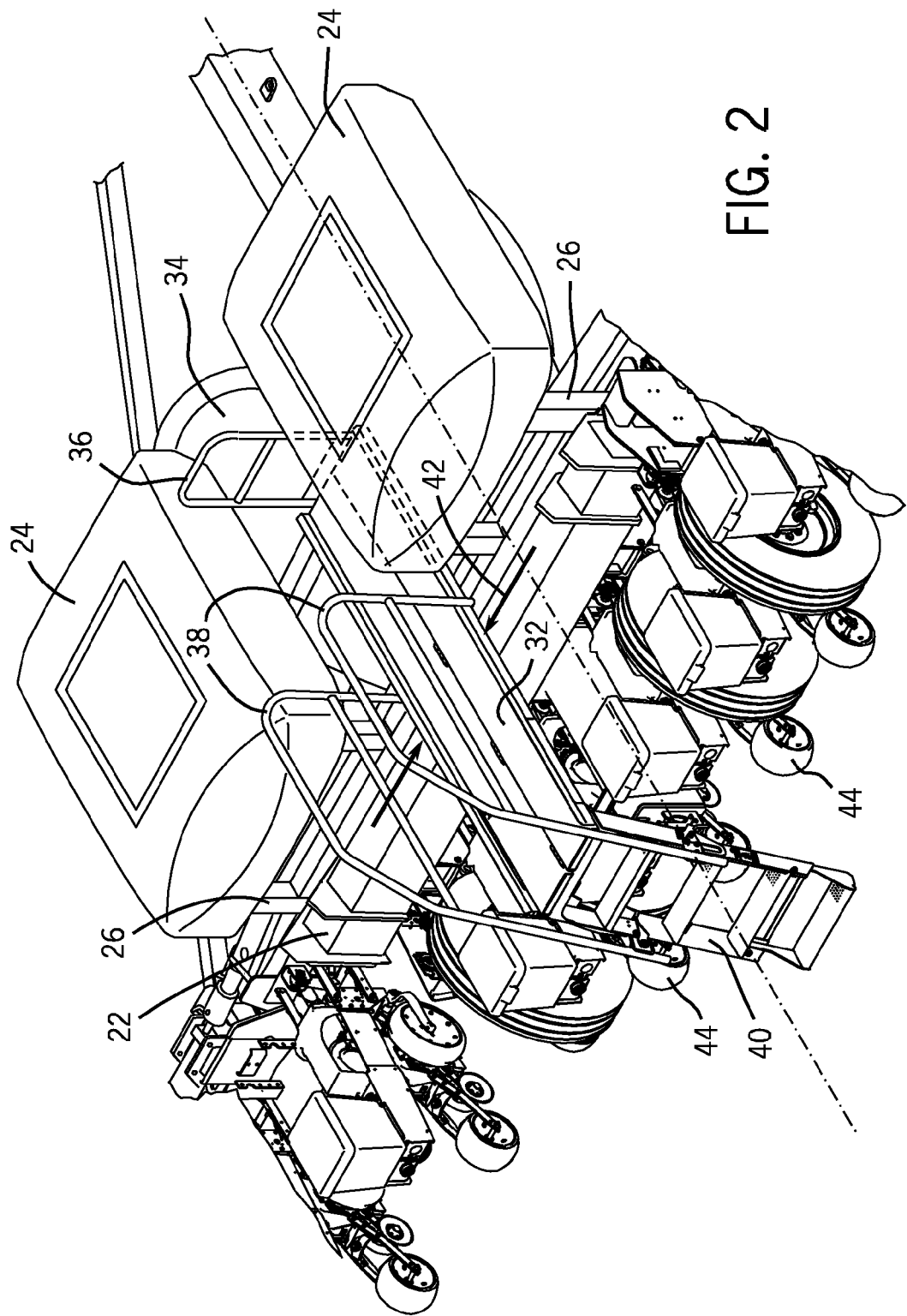

These and other features, aspects, and advantages of the present invention will become better understood when the following detailed description is read with reference to the accompanying drawings in which like characters represent like parts throughout the drawings, wherein:

FIG. 1 is a rear perspective view of a planter in accordance with aspects of the invention, including a platform or walkway and ladder for accessing a region near the upper components of the planter, particularly seed tanks; and FIG. 2 is a more detailed view of the arrangement of FIG. 1, showing the platform or walkway and a presently contemplated arrangement for the ladder, in which view the ladder is lowered or deployed for easily accessing the platform.

DETAILED DESCRIPTION

Referring now to the drawings, and first to FIG. 1, a planter is illustrated in a rear perspective view, and designated generally by reference numeral 10. The planter is designed as a towed implement, and is generally comprised of a frame 12 on which various components are mounted for distributing seeds in a field. The frame, in the illustrated embodiment, itself comprises a central beam that serves as a tow bar 14, and a pair of draft tubes 16 that extend rearwardly from a forward portion of the tow bar. The tow bar is designed to be mechanically coupled to a work vehicle, such as tractor (not shown) that serves to draw the implement over a field to be planted. In the illustrated embodiment, a central portion 18 of the implement is connected to the tow bar 14 and to the draft tubes 16, and generally aligned along a central axis 20.

A tool bar 22 extends generally transversely with respect to axis 20. The tool bar may include a central span extending across the central portion 18 of the implement, as well as wings extending beyond the central portion, typically near points at which the draft tubes 16 are anchored to the central portion. These wings may be, depending upon the width and design of the implement, folded forward, folded upward, and so forth to reduce the overall width of the implement, such as for transportation over roads. Such operations will typically be facilitated by an appropriate hydraulic power system, hydraulic actuators, and so forth (not shown).

The frame 12 supports a supply of seeds, as well as components intended for distribution of the seeds and for dispensing of the seeds in tilled or untilled soil. In the illustrated embodiment, for example, two seed tanks 24 are mounted on tank support structures 26. These structures, themselves, would typically include metal platforms, trusses, beams and the like extending from the lower frame, tool bar, and so forth.

As will be appreciated by those skilled in the art, the seed tanks 24 may be opened to receive one or more varieties of seeds to be planted in particular locations. Loading of the seeds may be automated, semi-automated or manual, with removable lids or access panels typically being provided in the upper surface of the seed tanks to facilitate loading of the seeds, inspection of the seeds, removal of debris, and so forth.

A series of row units 28 are attached to the tool bar and spaced apart a desired distance from one another so as to allow for dispensing seeds along parallel rows, and at the desired spacing in a field. Depending upon the design of the row units, and upon such factors as the nature of the field (e.g., tilled or untilled), each row unit may serve a variety of functions and may have structures designed for these functions. Such structures may include, for example, an opening disc, a metering system, a covering disc, a firming wheel, a fertilizer dispenser, and so forth. Recipients or hoppers may be mounted on the framework of each row unit for receiving seeds, fertilizer, or other materials to be dispensed by the row units. A distribution and seed singulation system 30 serves to communicate seeds from seed tanks 24 to the various row units.

As will be appreciated by those skilled in the art, the implement itself may have various widths, and may accommodate various row spacing, depending upon the type of seed, the type of field, and so forth. By way of example, the wings of the implement illustrated in FIG. 1, along with the central portion, provide for seeding 16 parallel rows in each pass of the implement in a field. More or fewer row units may be provided in such implements. It may also be noted that transport wheels illustrated aft of the central portion 18 of the implement are typically provided for transporting the implement across roadways, and for aiding in supporting the implement in a field. Various systems may be provided for raising or lowering the implement with respect of such wheels such that the row units are elevated above roadway surfaces during transport.

Because the row units are evenly spaced along the tool bar, and may be fairly closely spaced, access to the seed tanks 24, in conventional designs, may be quite difficult. The invention as illustrated in figures provides a platform or walkway that extends from a rear position, such as beyond the rear-most extent of the row units to a location between the seed tanks. In the embodiment illustrated in FIG. 1, the platform 32 is supported by bracing extending from the implement frame and forming part of the implement frame. Such bracing may also extend upwardly from the tool bar in the central portion 18 of the implement. The platform may be made up of a suitable material, such as steel sheet bent to form flanges along lateral edges to increase its resistance to bending. Non-skid surfaces may be provided on an upper surface of the platform.

The platform extends from the rear position to at least the space between the seed tanks, designated by reference numeral 34 in FIG. 1. Thus, an operator can stand on the platform, move between the tanks, service the tanks, such as for inspection and loading of seeds, and so forth without the need to stand on any other portion of the implement frame. In the illustrated embodiment, a forward rail 36 is provided that is secured to the platform 32 and may be grasped by an operator during servicing of the seed tanks to stabilize and limit the movement of the operator forward. Similar rails 38 may be secured to the platform and extend on either side thereof. Finally, a ladder 40 extends aft of the platform 32 and downwardly to permit easy access to the platform. Handrails 38 may extend beside the ladder to allow operators to stabilize themselves as they climb to the platform.

Referring to FIG. 2, a similar rear perspective view of a presently contemplated embodiment of the implement and platform is illustrated. As shown in FIG. 2, the width 42 of the platform and ladder is sufficiently narrow to allow the platform to extend between the seed tanks, and, where desired, between the central-most row units 44. The platform may be fixed in place, and certain implements, may be retrofitted between existing seed tanks without significant structural changes in the implement. Moreover, it should also be noted that all or a portion of the ladder may be retractable, removable, foldable, or otherwise displaceable to raise the ladder during operation of the implement in a field. For example, one or more lower rungs of the ladder may be folded up for stowage, or the entire ladder may be pivoted along an upper section to allow raising of the ladder, such as to a position between the handrails. The height of the platform 32 is preferably such as to allow for easy passage of an operator between a truck, wagon or other vehicle on which seeds, tools and the like may be loaded, so as to allow such vehicles to be pulled along side or backed toward the platform. The platform may thus allow for stepping between such vehicles and the platform directly without the need to climb the ladder.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A towed agricultural implement comprising:
    a frame including a tool bar extending generally transverse to a central axis along which the implement is towed in operation;
    a plurality of ground-contacting units coupled to the frame and secured to the tool bar; and
    an operator platform supported on the frame and disposed generally fore-and-aft above the ground-contacting units;
    a pair of tanks supported generally above the tool bar, and wherein the platform extends between the tanks; and
    a ladder extending from the platform aft behind the ground-contacting units.

2. The implement of claim 1, comprising a hand rail disposed forward of the tanks and extending to a level above the platform.

3. The implement of claim 1, wherein the platform does not extend laterally beyond limits of a space between the tanks.

4. The implement of claim 3, wherein the platform extends aft beyond a rear-most limit of the ground-contacting units.

5. The implement of claim 1, comprising a hand rail secured to the ladder.

6. The implement of claim 1, wherein the ladder is disposed in a fixed position with respect to the platform.

7. The implement of claim 1, wherein the ladder is displaceable from a lowered position with respect to the platform.

8. The implement of claim 1, wherein the pair of tanks is supported directly above the tool bar, and the platform extends directly between the tanks.

9. A towed agricultural implement comprising:
    a frame including a tool bar extending generally transverse to a central axis along which the implement is towed in operation;
    at least one seed tank supported by the frame and generally above the tool bar;
    a seed distribution system for distributing seeds from the tank;

a plurality of row units coupled to the frame and secured to the tool bar, the row units receiving seeds from the distribution system during operation;

an operator platform supported on the frame and disposed generally fore-and-aft above the row units;

a pair of tanks supported generally above the tool bar, and wherein the platform extends between the tanks; and a ladder extending from the platform aft behind the row units.

10. The implement of claim 9, comprising a hand rail disposed forward of the tanks and extending to a level above the platform.

11. The implement of claim 9, wherein the platform does not extend laterally beyond limits of a space between the tanks.

12. The implement of claim 11, wherein the platform extends aft beyond a rear-most limit of the row units.

13. The implement of claim 9, comprising a hand rail secured to the ladder.

14. The implement of claim 9, wherein the pair of tanks is supported directly above the tool bar, and the platform extends directly between the tanks.

15. A towed agricultural implement comprising:

a frame including a tool bar extending generally transverse to a central axis along which the implement is towed in operation;

a pair of seed tanks supported generally above the tool bar;

a seed distribution system for distributing seeds from the tanks;

a plurality of row units coupled to the frame and secured to the tool bar, the row units receiving seeds from the distribution system during operation;

an operator platform supported on the frame and disposed generally fore-and-aft above the row units and extending between the seed tanks; and a ladder extending from the platform aft behind the row units.

16. The implement of claim 15, comprising a hand rail disposed forward of the tanks and extending to a level above the platform.

17. The implement of claim 15, wherein the platform does not extend laterally beyond limits of a space between the tanks.

18. The implement of claim 15, wherein the platform extends aft beyond a rear-most limit of the row units.

19. The implement of claim 15, comprising a hand rail secured to the ladder.

20. The implement of claim 15, wherein the ladder is disposed in a fixed position with respect to the platform.

* * * * *